United States Patent [19]

Koch

[11] 4,220,976

[45] Sep. 2, 1980

[54] READ-OUT PROCESS FOR A CID SENSOR MATRIX

[75] Inventor: Rudolf Koch, Munich, Fed. Rep. of Germany

[73] Assignee: Siemens Aktiengesellschaft, Berlin & Munich, Fed. Rep. of Germany

[21] Appl. No.: 867,610

[22] Filed: Jan. 6, 1978

[30] Foreign Application Priority Data

Jan. 19, 1977 [DE] Fed. Rep. of Germany ....... 2702024

[51] Int. Cl.³ ..................... H04N 3/14; H01J 40/14
[52] U.S. Cl. .................... 358/213; 250/211 J
[58] Field of Search ............... 358/212, 213; 250/211 J

[56] References Cited

U.S. PATENT DOCUMENTS

| | | | |
|---|---|---|---|
| 3,919,468 | 11/1975 | Weimer | 358/213 |
| 4,001,501 | 1/1977 | Weimer | 358/213 |
| 4,080,622 | 3/1978 | Sugihara | 358/213 |

OTHER PUBLICATIONS

H. K. Burke, "Charge-Injection Imaging: Operating Techniques and Performance Characteristics," (IEEE Journal of Solid–State Circuits, vol. SC–11, No. 1, Feb. 1976.

Primary Examiner—Robert L. Griffin
Assistant Examiner—Edward L. Coles
Attorney, Agent, or Firm—Hill, Van Santen, Steadman, Chiara & Simpson

[57] ABSTRACT

A process is disclosed for reading out an image sensor matrix having sensor elements arranged in rows and columns and which produces television signals representative of an image. Read-out of the matrix for the production of the image consists of two sub-processes which follow one another in time. In the first sub-process, the items of information of the sensor elements provided in each individual row are read out one after another. The rows are read out consecutively. In the second sub-process, summed items of information are read out from groups of rows. Each row group may consist of two or more rows. As the read-out of a given group proceeds, corresponding items of information in each of the rows are summed together during the read-out so as to form the sums of corresponding items of information. The groups include all of the rows of the matrix and the groups are read out consecutively. The sums of the items of information are then each divided so as to be compatible with the items of information during the read-out of the individual rows. Alternatively, the items of information read out in the first sub-process are multiplied to be compatible with the sums of the items of information created during the second sub-process.

7 Claims, 1 Drawing Figure

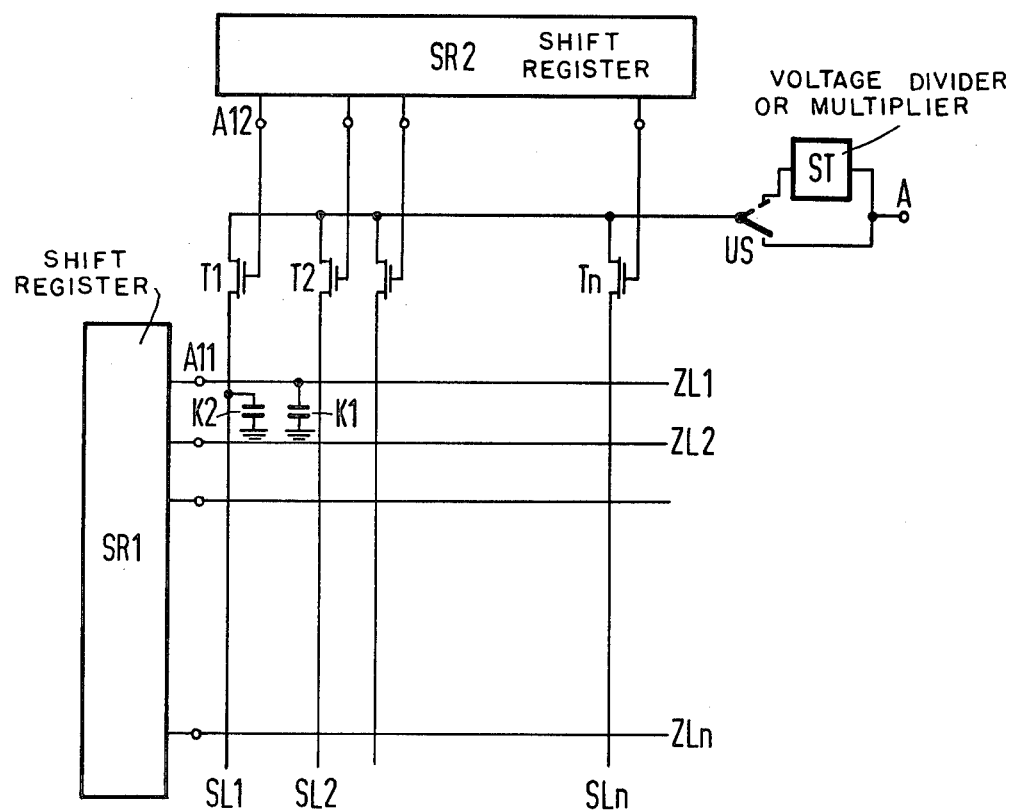

READ-OUT PROCESS FOR A CID SENSOR MATRIX

BACKGROUND OF THE INVENTION

The present invention relates to a read-out process for a CID (charge injection device) sensor matrix.

CID sensor matrices are known (IEEE Journal of Solid State Circuits, Vol. SC-11, No. 1, February 76, page 121-127). In a CID sensor matrix of this type, sensor elements arranged in the form of a matrix in rows and columns are provided on a surface of a substrate consisting of doped semiconductor material. Each sensor element consists of two insulating layer capacitors which are arranged beside one another and which are coupled to one another via the substrate. In each row, the insulating layer capacitors are in each case electrically conductively connected to one another by a row line, and in each column the other insulating layer capacitors are in each case connected to one another by a column line.

CID sensor matrices of this kind can be used as a picture recording unit in television cameras. As is known, in televisions, the image flicker is reduced by employing the so-called row jump process, i.e. half images are alternately recorded, employing the one or the other half of the number of rows for each half image. This row jump process must in fact be adhered to even in the recording unit. Therefore in a television compatible CID snesor matrix, the one and then the other half of the rows are alternately read out. Therefore the number of rows which a television compatible CID sensor matrix of this kind must possess is to be equal to the number of rows of which the television image is composed.

SUMMARY OF THE INVENTION

An object of the present invention is to provide a read-out process for a CID sensor matrix, in which fewer rows of the sensor matrix are required than the television image contains.

The object is realized in that in each read-out process, all the rows are consecutively non-destructively read out, and that subsequently in each case two or a plurality of rows are simultaneously read out in turn. Non-destructive read-out is known from the publication mentioned above in which such read-out is referred to as "parallel injection read out" and proceeds in such manner that in each sensor element of a selected row, the item of information previously stored beneath the insulating layer capacitors connected to the row line, is displaced towards the adjoining insulating layer capacitor in each case connected to a column line, during which time the column lines float at a reference potential. The potential of the column lines changes in accordance with the displaced information charges and each potential change per column line forms an output signal. Then the information charges are returned into the original insulating layer capacitors. The erasure of the recorded information can be effected by injection into the substrate.

When the read-out process in accordance with the invention is employed, for a television image having a predetermined number or rows, only half the number of matrix rows are required. A 600 row image can be recorded in the row jump process, for example, with a 300 row sensor. The surface space requirement of the sensor matrix is thus reduced to approximately half. The output signal is approximately double the magnitude of a conventional row jump process.

The read-out process will be explained in detail in the following description.

A CID sensor matrix will be assumed to possess n rows and n columns. $n^2$ image points are provided. The procedure for the read-out of the recorded image is that the n rows, commencing for example with the first row, are consecutively non-destructively read out to the n-th row. For this purpose, in each image point of this row, the information is displaced from the insulating layer capacitor connected to the relevant row line to the adjacent insulating layer capacitor connected to a column line. All the column lines have previously been brought to reference potential and are now electrically floating. In each column line, the displacement of the information produces a change in potential which corresponds to the displaced information. The column lines are now consecutively scanned, whereby the potential change is measured and processed to form the output signal. Thus a series of signal pulses is obtained. The information is then returned to the original insulating layer capacitors of this row. The above described process is now repeated successively for each row.

Following the read-out of the n-th row, for example two rows are now in each case read out simultaneously. For example, the first and second rows, then the second and third rows etc., and finally the (n-1)th and n-th rows are read out simultaneously. The read-out can be effected as described above for a row. It is merely necessary to carry out the displacement of the information simultaneously for additional rows. As previously, the column lines are scanned in turn and the changes in potential are further correspondingly processed to form the output signal.

As each row is now read out at least twice, during the first read-out process when each row is individually read out in turn, read-out must be carried out non-destructively. In the second read-out process when two or a plurality of rows are simultaneously read out in turn, the information in those rows which have already been read out and are no longer required for further read-out processes is erased.

In the second read-out process, the read-out signals are added to one another during the read-out of two or more rows. Therefore it is either necessary to carry out an appropriate division of the signal at the output stage during the second read-out process, or it is necessary to carry out a corresponding multiplication during the first read-out process.

The scanning of the rows and columns can be effected using shift registers. In order to scan the column lines, it is expedient to effect the scanning via multiplex transistors which are consecutively opened by a pulse which is passed through the shift register.

A television image is produced in that the first read-out process is employed to produce the first half image, and the second read-out process is used to produce the second half image. The succession of a first read-out process and a second read-out process together form one read-out process. The read-out processes are repeated periodically.

BRIEF DESCRIPTION OF THE DRAWING

The drawing is a block circuit diagram of a CID matrix which is read out in accordance with a process of the invention.

DESCRIPTION OF THE PREFERRED EMBODIMENTS

Row lines are referenced ZL1 to ZLn, and the column lines SL1 to SLn. The two insulating layer capacitors which are associated with the left-hand, upper sensor element of the matrix, bear the references K1 and K2, where K1 is connected to the row line ZL1, and K2 to the column line SL1. When the information is read out of the illustrated sensor element, first the matrix row ZL1 is operated via the output A11 of a first shift register SR1, as a result of which the information is shifted from K1 to K2. This produces a change in the potential of the column line SL1, which is scanned when a multiplex transistor T1 is briefly brought into the conductive state via the output A12 of a second shift register SR2. At the output A of the sensor matrix, there now occurs an output signal which corresponds to the information stored in K1. The lines SL2 to SLn are then scanned correspondingly via multiplex transistors T2 to Tn. The other rows ZL2 to ZLn are then read out correspondingly, operating the other outputs of the shift register SR1.

The above described first sub-process of the read-out process is followed by a second sub-process, in which two or a plurality of matrix rows, e.g. ZL1 and ZL2, which belong to one group, are commonly read out. For this purpose, the items of information contained in the sensor elements of the two rows are fed to the assigned column lines SL1 to SLn and the sum signals formed on said lines are read out consecutively in the above described manner. A change-over switch US which occupied the switching position illustrated by the solid line during the first sub-process, is now reversed into the position illustrated by the broken line in order to divide the read-out sum signals emanating from two or a plurality of rows ZL1 to ZLn in a voltage divider ST in such a manner that they match the signals read out during the first sub-process with respect to level.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A process for reading out an image sensor matrix having sensor elements arranged in rows and columns, wherein each read-out process is composed of two sub-processes which follow one another in time, comprising the steps of: in the first sub-process, reading out one after another the items of information of the sensor elements provided in each individual row and reading out the rows consecutively; and in the second sub-process reading out the items of information from consecutive groups of individual rows, each group comprising at least two rows, corresponding items of information in rows of the same group being summed to form items of sum information which are read out one after another, the groups being read out consecutively, said groups including all the rows of the matrix.

2. A process as claimed in claim 1, wherein the items of information read out during the first sub-process step represent a first portion of a television image signal which corresponds to a first half image formed in accordance with a row jump process, and that the items of information read out during the second sub-process step represent a second portion of the television image signal which corresponds to a second half image.

3. A process for reading out an image sensor matrix having sensor elements arranged in rows and columns so as to form an image signal of an image, comprising the steps of:
   (a) reading out items of information one after the other in each individual row and consecutively reading out the rows so as to form signals representative of a first portion of the image;
   (b) reading out sums of items of information one after the other from row groups, each row group comprising at least two rows and each of said sums comprising an item of information from a first of the rows of the group added to a corresponding item of information of corresponding row position from another of the rows of the group, said groups being consecutively read out; and
   (c) dividing each item of information from the read out of the group so they are compatible with the items of information from the read out of the individual rows, the divided items of information forming signals representative of a second portion of the image.

4. The process of claim 3 wherein a first one of the groups comprises first and second rows, a second one of the groups comprises second and third rows, and a third one of the groups comprises third and fourth rows, the first through fourth rows being consecutive.

5. The process of claim 4 including the step of producing the items of information of charge injection from an image position to an adjacent storage position, the items of information being read out from each of the adjacent storage positions.

6. The process of claim 4 wherein the read out of the individual rows is non-destructive.

7. A process for reading out an image sensor matrix having sensor elements arranged in rows and columns, so as to form an image signal of an image, comprising the steps of:
   (a) reading out items of information one after the other in each individual row and consecutively reading out the rows;
   (b) reading out sums of items of information one after the other from row groups, each row group comprising at least two rows and each of said sums comprising an item of information from a first of the rows of the group added to a corresponding item of information of corresponding row position from another of the rows of the group, said groups being consecutively read out so as to form signals representative of a first portion of the image; and
   (c) multiplying each item of information from the read out of each individual row so they are compatible with the items of information from the read out of the groups, the multiplied items of information forming signals representative of a second portion of the image.

* * * * *